United States Patent [19]

Spight

[11] Patent Number: 4,462,046
[45] Date of Patent: Jul. 24, 1984

[54] MACHINE VISION SYSTEM UTILIZING PROGRAMMABLE OPTICAL PARALLEL PROCESSING

[75] Inventor: Carl Spight, Columbia, Md.

[73] Assignee: AMAF Industries Incorporated, Columbia, Md.

[21] Appl. No.: 394,812

[22] Filed: Jul. 2, 1982

[51] Int. Cl.³ .............................................. H04N 7/18
[52] U.S. Cl. ............................... 358/101; 350/162.13; 350/162.14; 358/93; 364/822; 382/42
[58] Field of Search ................. 358/101, 93, 107, 106; 382/42; 364/822; 350/162.13, 162.14; 356/393, 398

[56] References Cited

U.S. PATENT DOCUMENTS

| | | | |
|---|---|---|---|
| 4,084,255 | 4/1978 | Casasent | 382/42 |
| 4,115,801 | 9/1978 | Salmen | 382/42 |
| 4,187,000 | 2/1980 | Constant | 364/822 |
| 4,282,511 | 8/1981 | Southgate | 350/162.14 |
| 4,357,676 | 11/1982 | Brown | 350/162.13 |
| 4,389,093 | 6/1983 | Jackson | 364/822 |
| 4,414,566 | 11/1983 | Peyton | 382/42 |

Primary Examiner—Howard W. Britton
Attorney, Agent, or Firm—Birch, Stewart, Kolasch & Birch

[57] ABSTRACT

An object or scene viewed by the programmable optical processor based machine vision system is converted into a video signal representative of a spatial orientation and position of a viewed object being viewed. Reference information stored within a system control processor and indicative of a desired object to be identified and its spatial orientation and position of is used to produce a reference video signal. Both the object video signal representative of the object being viewed and the reference video signal representative of the desired object to be identified are converted into incoherent optical representations of these signals which are optically parallel processed in order to obtain a cross-correlation of the respective signals. This cross-correlation is converted into an electrical signal and is evaluated using any suitable known correlation evaluation technique in order to determine whether a high degree of correlation exists between the object being viewed and its position and orientation and the reference signal indicative of a desired object to be identified and its orientation. If a high degree of correlation exists, the effector control processor is provided with information related to the object so that the effector control processor may control a robotic manipulator in a desired manner. If a high degree of correlation does not exist between the respective signals, new object signal or reference signal information related to the object being viewed is iteratively correlated with the remaining original signal in order to determine the degree of correlation between these two signals.

58 Claims, 4 Drawing Figures

MACHINE VISION SYSTEM UTILIZING PROGRAMMABLE OPTICAL PARALLEL PROCESSING

BACKGROUND OF THE INVENTION

The present invention relates to a system for facilitating near real-time vision for a manufacturing processing machine. More specifically, the present invention relates to the use of optical processing for a programmable industrial automation system wherein object identification, location, and orientation may be determined.

DESCRIPTION OF THE PRIOR ART

Heretofore, robot manipulators have been utilized in relatively large scale manufacturing assembly lines to perform simple manipulative tasks including loading and unloading machines, stacking parts, spray painting, and spot-welding. These machines generally responded to a set of highly specific program commands wherein the positioning and orientation of the workpieces manipulated were known with considerable precision. The programming of such a manipulator was relatively complicated and the program was useful only if the positioning of the workpieces was held within the relatively precise tolerances.

Recently, there has been an attempt to increase the flexibility of such manipulators by the addition of various sensory capabilities. Tactile and auditory capabilities are presently being developed. Additionally, visual capabilities are being developed. Range finding, structured light and binocular vision techniques have been employed to produce robotic vision systems. However, none of these systems are particularly useful in applications requiring identification, determination of location and of orientation. Further, the known robotic vision systems require substantial processing time between vision sensing and identification.

Accordingly, a need in the art exists for a robotic vision system capable of near real-time sensing and analysis, to identify and determine the location and orientation of workpieces in a realistic batch manufacturing environment.

SUMMARY OF THE INVENTION

Accordingly, it is primary object of the present invention to provide a system for identifying and determining the location and orientation of parts in a manufacturing batch environment.

It is another object of the present invention to produce a substantially real-time vision system capable of identification and determination of location and orientation of parts in a manufacturing batch environment.

It is still another object of the present invention to utilize optical parallel processing to efficiently correlate a viewed scene with information stored within the processor in order to facilitate the identification and determination of location and orientation of parts in a manufacturing batch environment.

It is yet another object of the present invention to iteratively correlate a viewed scene with a stored representation of desired objects to be identified in order to produce substantially real-time identification and determination of location and orientation in a vision system for manufacturing batch environments.

In the preferred embodiment, the robotic vision system of the present invention illuminates the scene to be viewed with incoherent light and monitors the scene with one or more video cameras. The scene monitored by the one or more video cameras is cross-correlated with at least one processor stored representation of a possible part to be identified. The two signals are optically correlated and if a high degree of correlation exists, the systems processor is informed so as to command a robotic effector to perform a desired manipulation on the viewed scene.

The signals representative of varied camera perspectives may be iteratively correlated with stored data representative of a desired object to be identified in order to determine spacial orientation and position by the degree of correlation between the viewed scene and the desired object to be identified. If a high degree of correlation does not exist between any of the reproduced scene perspectives and the information indicative of a desired object to be identified, the system control processor may compare the various camera orientations with a new desired object to be identified. Successive iterative correlations are thus performed in order to determine which desired object to be identified produces a high degree of correlation with which viewed scene perspective. Alternatively, stored representations of various possible scene perspectives may be iteratively correlated to a single viewed scene until a higher degree of correlation is detected. When this high degree of correlation exists, the system controlled processor is instructed as to the position and orientation as well as identification of at least one object being viewed. The systems control processor may then generate commands which allow the effector control processor and robotic effector to perform a desired operation on the scene being viewed.

The present invention utilizes parallel optical processing in order to increase speed and reduce processing complexity. The monitored video signal is converted into an incoherent optical image by a display or cathode ray tube. This incoherent optical image representative of the scene being viewed is converted into a coherent optical signal corresponding thereto through the use of an incoherent to coherent optical converter such as a spatial light modulator. The output of the spatial light modulator is a coherent optical signal containing the information produced by the monitoring video camera. This information is correlated with information representative of a desired scene to be viewed recalled from memory located within the system control processor and also converted into an incoherent optical system through the use of a display or cathode ray tube. This incoherent optical signal representative of a desired object to be identified is converted into a coherent signal by a spatial light modulator. The two coherent optical signals are then correlated by converting the respective signals into their Fourier transforms via an optical lens system and the Fourier transforms are then summed with a beam splitter. A spatial light modulator is then used to take the square of this sum of the amplitudes of the signals. This square of the sum of the amplitudes includes real components which can easily be discriminated from imaginary complex conjugate components producing a combined signal corresponding to the Fourier transform of the correlation between the object signal and reference signal. The inverse Fourier transform of this combined signal is then generated through use of another optical lens in order to produce a cross-correlation of the viewed scene and a desired object to be identified. This cross-correlated optical signal is converted into an electrical signal by a video camera of charge coupled device (CCD) array and the information is presented to the system control processor. The system control processor then monitors the degree of correlation and controls the robotic effector as previously mentioned.

BRIEF DESCRIPTION OF THE DRAWINGS

The objects and attendant advantages of the present invention will become readily appreciated by reference to the following detailed description and accompanying drawings which serve to create a better understanding of the invention, wherein.

DETAILED DESCRIPTION OF THE PREFERRED EMBODIMENT

Figure 1:
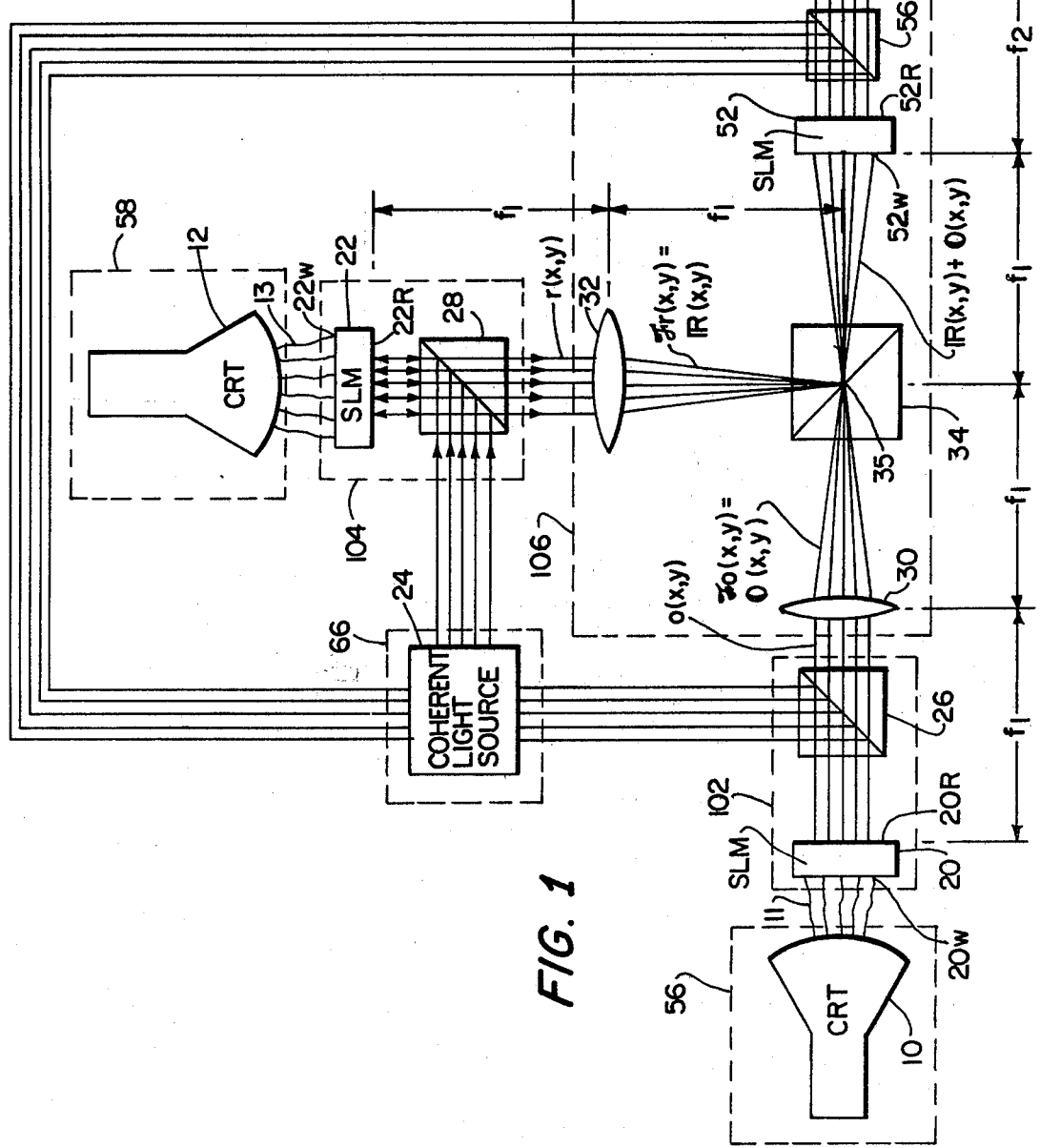
FIG. 1 is a schematic illustration of one form of optical processing which could be used according to the teachings of the present invention.

Referring to FIG. 1, the optical processing used in the system of the present invention will now be described.

The scene being viewed by the vision system of the present invention (hereinafter referred to as the object being viewed) has been monitored by a video camera (to be later described) and converted into an electrical signal which produces an optical image on a object reproduction display 10. Simultaneously, a reference display indicative of a desired object to be identified is displayed on a reference display 12 from data stored within a memory of the system control processor (to be later described). In the preferred embodiment, the object display 10 and the reference display 12 are cathode ray tube monitors such as General Electric GE9000 monitors. Alternatively, it would be possible to use any type of suitable display to produce an incoherent optical signal 11 representative of the object or scene being viewed as produced by the object display 10 and an incoherent optical signal 13 the reference object or desired object to be identified produced by the reference display 12.

The incoherent light 11 associated with the object display 10 is applied to a write surface 20W of a first or object spatial light modulator (SLM) 20. Simultaneously, coherent light produced by a coherent light source 24 is applied to a read surface 20R of the object spatial light modulator 20. This coherent light is directed to impinge upon the read surface 20R of the object spatial light modulator 20 by an object read light beam splitter 26 which redirects the coherent light produced by the coherent light source 24 against the read surface 20R of the spatial light modulator 20 while allowing the coherent light modulated by the spatial light modulator 20 and reflected from the read surface 20R of the spatial light modulator 20 to pass therethrough without redirection. The coherent light reflected from the spatial light modulator 20 forms an object beam viewed signal o(x,y) which is a function of the data reproduced by the object display 10.

In the preferred embodiment, the coherent light source 24 is a suitably powered helium-neon laser. However, any suitable coherent light source may be used. In the preferred embodiment, the spatial light modulator is a micro-channel spatial light modulator as disclosed in the article entitled "Optical Information Processing Characteristics of the Micro Channel Spatial Light Modulator", written by C. Warde et al, and published in the June 15, 1981 issue of Applied Optics (Vol. 20, No. 12). While this spatial light modulator is used in the preferred embodiment, virtually any suitable spatial light modulator may be used.

Similarly, the incoherent light signal 13 produced by the reference display 12 is applied to a write surface 22W of a second or reference spatial light modulator 22. Coherent light produced by the coherent light source 24 is also applied to a read surface 22R of the reference spatial light modulator 22 after being redirected by a second or reference read light beam splitter 28 which serves to redirect to the coherent light produced by the coherent light source 24. The coherent light reflected off the read surface 22R of the reference spatial light modulator 22 is passed through the reference read light beam splitter 28 without redirection. This coherent light signal modulated by the spatial light modulator 22 is representative of the reference object or desired object to be identified produced on the reference display 12 from data recalled from memory by the system control processor (to be later described).

The coherent light object signal o(x,y) produced by the object spatial light modulator 20 is applied to an object Fourier transform lens 30 of convex shape to produce the Fourier transform $\phi(x,y)$. Due to the physical characteristics of a spherical lens, the light amplitude distribution in the back focal plane of such a spherical lens is the two dimensional complex Fourier transform of the signal applied to the lens' front focal plane. Thus, the signal at the back focal plane of the object Fourier transform lens 30 is related to the applied signal as follows:

$$\phi(x,y) = \frac{1}{\sqrt{2\pi}} \int_{-\infty}^{\infty} o(x,y) e^{jxy} dx dy \left( \text{where } j = \sqrt{-1} \right)$$

Similarly, the modulated coherent light reference signal r(x,y) is passed through a reference Fourier transform lens 32 of convex shape to form the Fourier transform of this modulated signal IR(x,y). Thus, at the back focal plane of the reference Fourier transform lens 32, the Fourier transform of the modulated reference signal is produced as follows:

$$IR(x,y) = \frac{1}{\sqrt{2\pi}} \int_{-\infty}^{\infty} r(x,y) e^{jxy} dx dy \left( \text{where } j = \sqrt{-1} \right)$$

Both the Fourier transform of the object signal $\phi(x,y)$ and the Fourier transform of the reference signal IR(x,y) are applied together at the back focal plane of their respective lenses 30, 32 to point 35 and combined by a beam splitter 34 which serves to redirect the Fourier transform of the reference signal IR(x,y). Thus, the sum $\phi(x,y) + IR(x,y)$ is produced by the beam splitter 34.

The sum $\phi(x,y) + IR(x,y)$ is then applied to a write surface 52W of a third spatial light modulator 52. Coherent light produced by the coherent light source 24 is applied to the read surface 52R of the third spatial light modulator 52 after being redirected by a third beam splitter 56 which receives the light from the coherent light source 24 in any conventional manner. The spatial light modulator produces a signal at its read surface having an intensity proportional to the intensity of the signal applied to its write surface. Since the intensity is proportional to the square of the absolute value of the amplitude, the output of the square spatial light modulator produces:

$$|[\phi(x,y) + IR(x,y)]|^2 = [\phi(x,y) + IR(x,y)] \cdot$$

$$[\phi(x,y) + IR(x,y)]^* = [\phi(x,y) \cdot \phi(x,y)^* + IR(x,y) \cdot IR(x,y)^* +$$

$$\phi(x,y) \cdot IR^*(x,y) + IR(x,y) \cdot \phi^*(x,y)]$$

(where * denotes the complex conjugate)

The $\phi(x,y) \cdot \phi(x,y)^*$ and $IR(x,y) \cdot IR(x,y)^*$ terms are generated on axis to produce a bright spot which will be passed through an inverse Fourier transform lens 36 and to a video detector 40. As these terms remain on axis and the $O(x,y) \cdot \phi^*(x,y)$ and $IR(x,y) \cdot IR^*(x,y)$ terms may be easily filtered out and will therefore be dropped.

Figure 4:
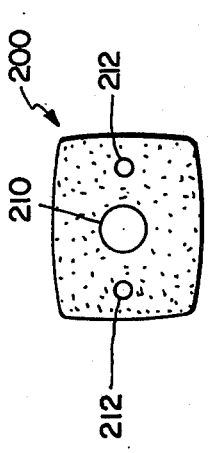
FIG. 4 is an example of an optical signal observed.

The optical signal provided by multiplication of the respective Fourier transforms of the object signal and reference signals $\phi(x,y)$ $IR^*(x,y) + IR(x,y)$ $O^*(x,y)$ is applied to the inverse Fourier transform lens 36 of convex shape. This lens produces a correlation of the optical and reference signals at its back focal plane. If $IR(x,y)$ $\phi^*(x,y)$ and $\phi(x,y)$ $IR(x,y)^*$ components exist, the correlation will produce two points of light symmetrically arranged about the center axis. The presence and size of these bright spots indicate the presence and amount of correlation while the position of the spot indicates the position of the object on, for example, a conveyor. An example of a signal which might be seen by the video detector 40 is illustrated in FIG. 4. The optical signal received by the video detector 40 is generally indicated as 200. The center spot 210 is produced by the $O(x,y) \cdot O^*(x,y)$ and $R(x,y) \cdot IR(x,y)$ components after they are inversely transformed while the $F^{-1}IR(x,y)$ $\phi(x,y)$ and the $F^{-1}\phi(x,y)$ $\phi^*(x,y)$ produce points of light 212.

This convolution of the object signal produced by the object display 10 and the reference signal produced by the reference display 12 is applied to a video detector 40 arranged at the focal distance of the inverse Fourier transform lens 36. This video detector may be a video camera or, alternatively, a charge coupled device (CCD) array. Thus, the object signal is correlated with the reference signal in a manner which is utilized by the remainder of the system as explained in conjunction with FIG. 2. It should be noted, however, that for optimum functioning of the device of the present invention, the object spatial light modulator 20 should be positioned with its reading surface 20R placed in the front focal plane of the object Fourier transform lens 30 at a distance $f_1$ while the back focal plane of the object Fourier transform lens 30 should coincide with the center of the beam splitter 34 at the same distance $f_1$. The same focal length relationship should be adhered to in the positioning of the reference spatial light modulator 22 and the beam splitter 34 and the reference Fourier transform lens 32 as well as the spacing of the video detector 40, square spatial light modulator 52 a focal length away from the inverse Fourier transform lens 36.

Figure 2:
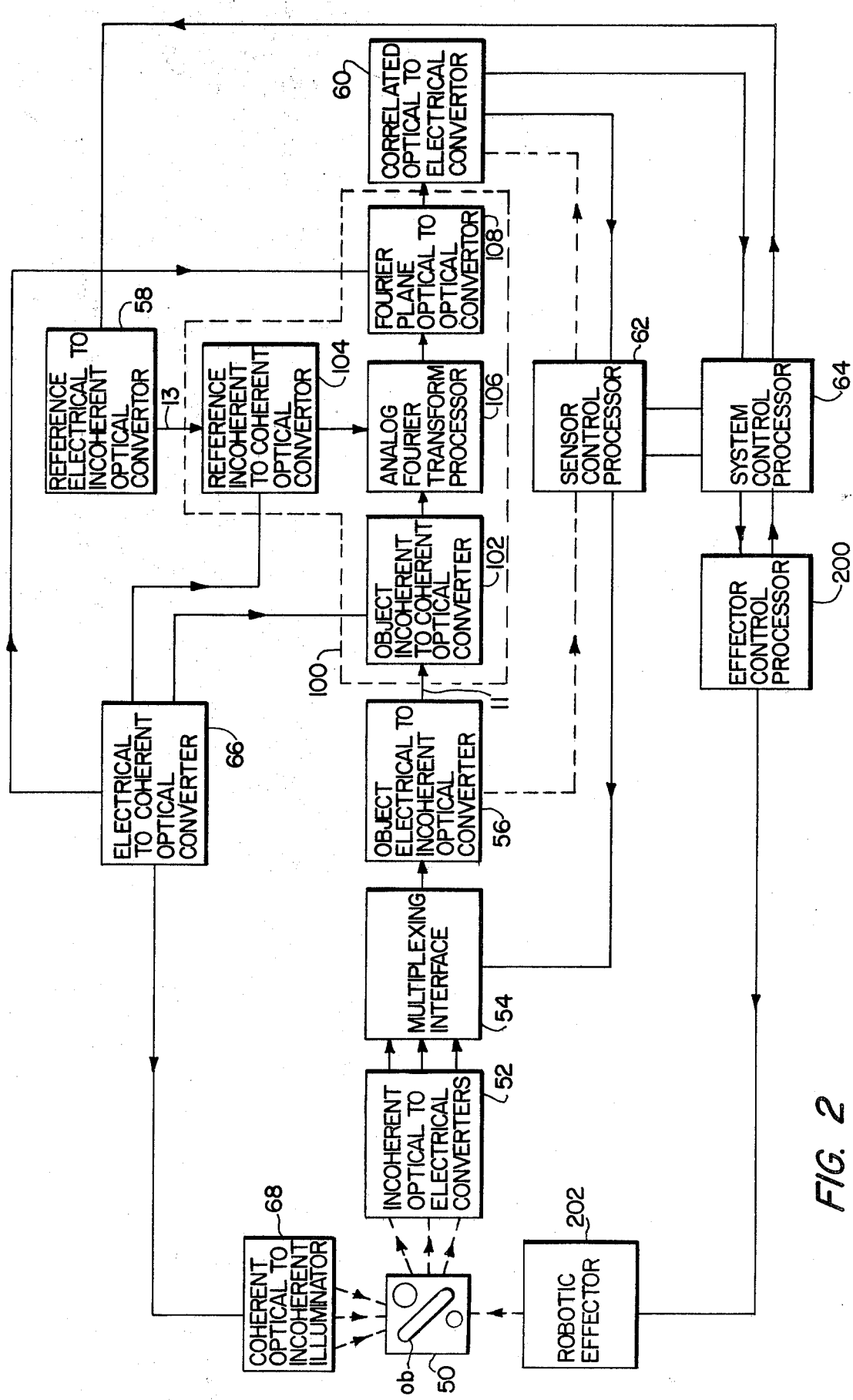
FIG. 2 is a schematic block diagram of the system of the present invention.

The basic operation of the optical correlation system of the present invention allows the simultaneous parallel processing of each point in the reference and object signals through the unique optical characteristics of this system. This parallel processing greatly increases the speed of the correlation system used in the vision system of the present invention so that the vision system of the present invention may approximate real-time processing. The functioning of the vision system of the present invention will further be described with reference to FIG. 2. The portions of FIG. 1 which correspond to the system boxes in FIG. 2 are boxed with dashed lines identified by reference numerals corresponding to those used in FIG. 2.

The objects Ob to be viewed by the vision system of the present invention may be arranged randomly on a viewing table 50. These objects are illuminated by incoherent light produced by a coherent optical to incoherent illuminator 68 which diffuses coherent light produced by a central electrical to coherent optical converter 66 which in the preferred embodiment is a helium-neon laser. In the preferred embodiment, the coherent optical to incoherent illuminator 68 comprises a glass diffuser.

According to the teachings of the present invention, incoherent optical to electrical converters 52 view the objects Ob resting on the viewing table 50. The signals generated by the incoherent optical to electrical converters 52 are interfaced by a multiplexing interface 54 which serves to combine the signals produced by the incoherent optical to electrical converters 52 and to produce a single signal therefrom. In the preferred embodiment, the incoherent optical to electrical converters include a plurality of General Electric GE 4TN2200 A2 solid state cameras. Associated GE 4PN2110 A1 interface modules are utilized to produce the multiplexing interface 54 of the present invention. However, any video cameras and multiplexing interface may be used to achieve this function.

The video signal produced by the multiplexing interface 54 is applied to an electrical to incoherent optical converter 56 to generate an optical object signal. The object display 10 of FIG. 1 is a portion of this electrical to incoherent optical converter 56. Simultaneously, a system control processor 64 recalls from its memory data indicative of a reference object or desired object to be identified. This data is presented to an electrical to incoherent optical converter 58 which includes the reference display 12 of FIG. 1. The incoherent object signal 11 produced by the object display 10 within the electrical to incoherent optical converter 56 and the reference incoherent signal 13 produced by the reference display 12 within the electrical to incoherent optical converter 58 are then processed by an optical parallel processor 100 as disclosed in FIG. 1.

The optical parallel processor 100 includes an object incoherent to coherent optical converter 102, a reference incoherent to coherent optical converter 104, an analog Fourier transform processor 106 and a Fourier plane optical to optical converter 108. The object incoherent to coherent optical converter 102 and the reference incoherent to coherent optical converter 104 both receive coherent light waves produced by the electrical to coherent optical converter 66. The object incoherent to coherent optical converter also receives the incoherent object signal 11 produced by the object electrical to incoherent optical converter 56 and produces an equivalent coherent light signal at its output. The object incoherent to coherent optical converter includes an object spatial light modulator 20 and object read light beam splitter 26.

Similarly, the reference incoherent to coherent optical converter 104 receives an incoherent signal 13 from the reference electrical to incoherent optical converter 58 and produces, at its output, a coherent light signal equivalent thereto. The reference incoherent to coherent optical converter includes a reference spatial light modulator 22 and reference read light beam splitter 28.

The coherent object signal produced by the object incoherent to coherent optical converter 102 and the coherent reference signal produced by the reference incoherent to coherent optical converter 104 are applied to an analog Fourier transform processor 106 which includes the object Fourier transform lens 30, reference Fourier transform lens 32, and beam splitter signal multiplier 34. The output of the analog Fourier transform processor 106 is the square of the sum of the Fourier transform of the object signal $\phi(x,y)$ and the Fourier transform of the reference signal $IR(x,y)$. The sum is produced by the beam splitter 34 while the sum is squared by the square spatial light modulator 52. This product is applied to a Fourier plane optical to optical converter 108 which includes the inverse Fourier transform lens 36 of FIG. 1. This Fourier plane optical to optical converter 108 converts the product of the sum of the Fourier transforms of the object signal and reference signal into a cross-correlation of the respective signals as previously discussed.

This cross-correlated Fourier transform signal $\phi(x,y)^* IR(x,y)$ is applied to a correlated signal optical to electrical converter 60 including video detector 40. The electrical correlation output of the correlated signal optical to electrical converter 60 is then processed by the system control processor 64 in a known manner in order to determine the degree of correlation between the object signal $o(x,y)$ and reference signal $r(x,y)$. When the degree of correlation between these respective signals exceeds a predetermined limit, the particular configuration then viewed by the incoherent optical to electrical converters 52 and their associated multiplexing interface 54 is determined to be closely associated with the reference signal indicative of the desired object to be identified recalled from memory within the system control processor 64. A high degree of correlation informs the system control processor 64 that the scene being viewed is closely approximated by the computer reproduced reference scene. Thus, it is possible to both identify the objects being viewed Ob and determine their location and spatial orientation via the parallel optical correlation utilized in the present invention.

If the correlation between the object signal and reference signal does not exceed a predetermined limit, then the system control processor 64 determines that the particular configuration then being viewed by the incoherent optical to electrical converters 52 and their associated multiplexing interface 54 does not coincide with the reference signal indicative of a desired object to be identified. When this is the case, the multiplexing interface 54 causes the image provided to the object electrical to incoherent optical converter 56 to be changed to provide a new orientation or positioning of the object being viewed. Again, if the correlation between this signal and the reference signal does not exceed a predetermined limit, another iteration is performed.

The system of the present invention, as controlled by the system control processor 64, thus repeatedly correlates a multiplicity of particular configurations of the object being viewed Ob with the reference signal indicative of a desired object to be identified to determine the correlation therebetween. If all configurations of orientation and position have been correlated with the reference signal and an insufficient correlation therebetween is discovered, the system control processor 64 may then recall a new data set indicative of a new desired object to be identified and thus a new reference signal for successive iterative comparison with particular configurations monitored by the incoherent optical to electrical converters 52 and their associated multiplexing interface 54. Thus, it is possible for the system of the present invention to correlate a plurality of possible orientations of an object with plurality of reference signals representative of desired objects to be identified in order to determine what object is being viewed and its position and orientation in space.

Once the object is identified, the system control processor 64 provides this information and object position information to an effector control processor 200 which may drive a robotic effector or manipulator 202 to perform any desired task on the object being viewed. Position of the object is determined on the basis of the position of the bright points 212 viewed by the video detector 40. Because of the use of parallel optical processing which facilitates rapid iterations of the correlation between particular configurations of the object being viewed and the reference signals indicative of the object to be identified, the system of the present invention may identify the object, its location and orientation in an extremely fast, substantially real-time manner. This, even objects Ob moving along a conveyor line may be detected by the vision system of the present invention and identified with an understanding of the object's location and orientation in sufficient time to perform a manipulative operation on the object via robotic effector 202 before the object is shifted, to any great extent, by the conveyor.

The optical quality of the optical signals utilized in the correlation process of the present invention is controlled via a sensor control processor 64 which provides synchronization signals to the object electrical to incoherent optical converter 56, and correlated optical to electrical converter 60. Also, the sensor control processor 62 functions to provide automatic gain control to the signals applied to the object electrical to incoherent optical converter 56 as well as adjust the average signal gain produced by the correlated optical to electrical converter 60. The sensor control processor 62 monitors the brightness of the center spot 210 which should be generally constant and adjusts the signal intensities in response thereto, thereby functioning as a prior art automatic gain control and synchronization circuit. The sensor control processor 64 further provides information to the multiplexing interface 54 which allows the multiplexing interface 54 to determine which particular configuration monitored by the incoherent optical to electrical converters 52 is to be applied to the object electrical to incoherent optical converter 56. The system control processor may be any suitable circuitry, in the preferred embodiment, the processor is a General Electric GE PN2303 decision processor. However, any suitable circuitry may be utilized consistent with the functions of this circuit.

Any microprocessor of sufficient power and with sufficient memory may be utilized as a system control processor 64. The effector control processor 200 and robotic effector 202 may be any known manipulator and controller.

An alternative embodiment of the present invention would allow the incoherent optical to electrical converters 52 to view a single perspective of the object Ob being viewed. Instead of iterating possible particular configurations of the object by viewing the object from various positions, a plurality of configurations of each desired object to be identified would be stored within the system control processor 64. For each iteration of the parallel optical processing of the present invention, a new reference signal would be provided. Each desired object to be identified would be defined by a plurality of reference signals indicative of a number of particular orientations of the object being viewed. Thus, a plurality of iterations could be performed without the need to vary the apparent perspective of the scene viewed by the incoherent optical to electrical converters 52. Alternatively, the plurality of reference signals could be produced by computer generated rotation of translation images of each object to be identified.

Figure 3:
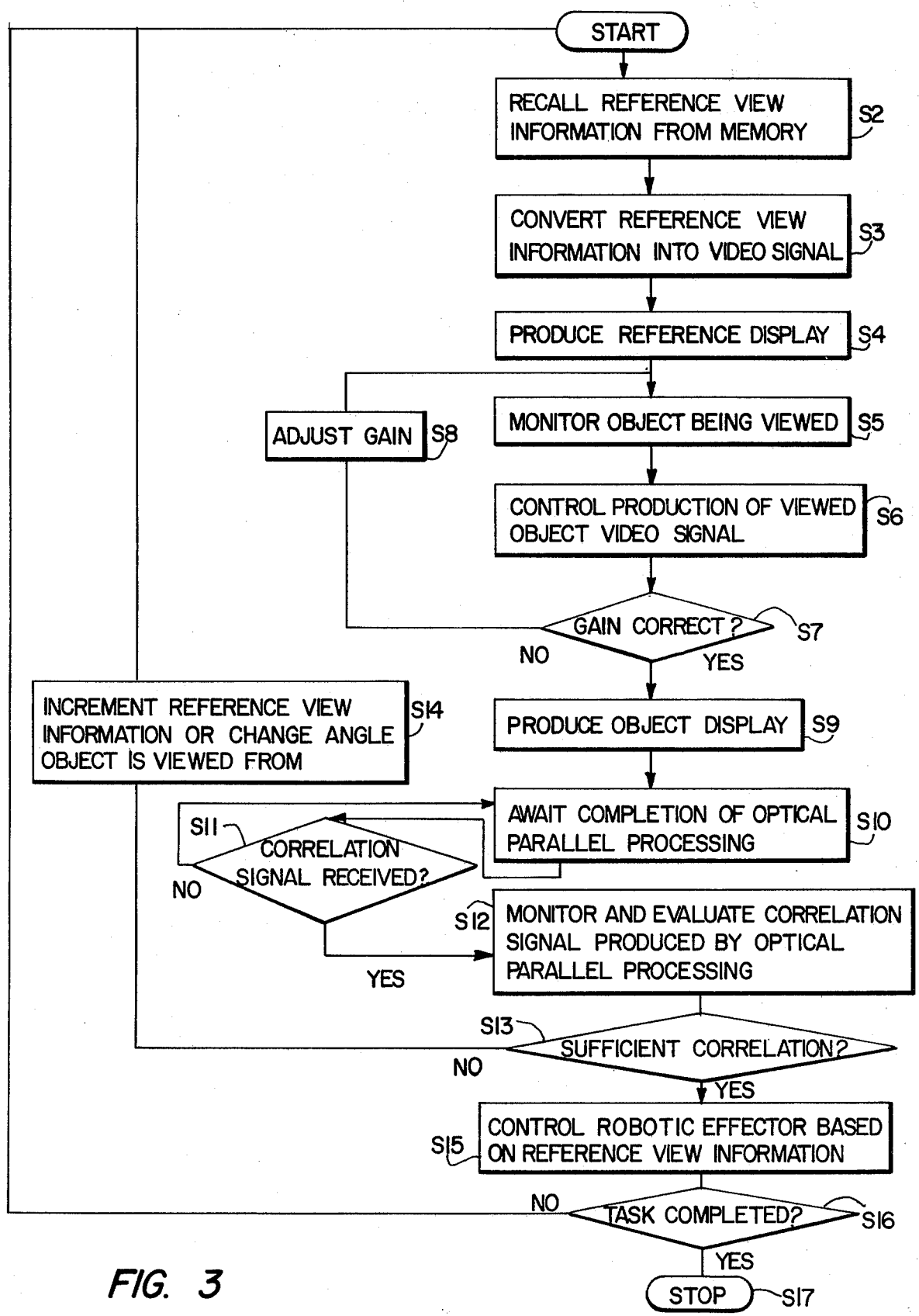
FIG. 3 is a flow chart of the program used by the system control processor to control the video system of the present invention.

The system control processor 64 of the present invention operates using the algorithm illustrated in FIG. 3 of the present application. The following description will serve to explain the algorithm of this figure.

The system control processor 64 of the present application functions to control the circuitry of the present invention by relying on an algorithm such as that disclosed in FIG. 3. When the optical processing according to the teachings of the present invention is initiated (S1), the system control processor 64 recalls reference view information from memory located in the system control processor 64 (S2). This reference view information is converted into a video signal by the system control processor (S3) and is presented to the reference electrical to incoherent optical converter 58 to produce a reference display (S4).

The system control processor 64 then enables the monitoring of the object being viewed (S5) and controls the production of a viewed object video signal (S6). The strength of this viewed object video signal is monitored (S7) and if the gain is correct, an object display is produced (S9). If the gain is incorrect, the gain is adjusted (S8) by the multiplexing interface 54 under the control of the system control processor and its associated sensor control processor 62 to produce a signal having the correct gain. The object being viewed is then again monitored (S7) and an object video signal is produced.

The object display produced by the object electrical to incoherent optical converter 56 and the reference display produced by the reference electrical to incoherent optical converter 58 are then used to perform the optical parallel processing according to the teachings of the present invention. The system control processor 64 awaits completion of this optical parallel processing (S10). When the correlation signal is received, the system control processor initiates monitoring and evaluation of the correlation signal produced by the optical parallel processing (S12).

This monitoring and evaluation of the correlation signal may be performed in any known manner in order to evaluate the degree of correlation between the reference view information indicative of the desired object to be identified and the object or scene being viewed. If sufficient correlation exists (S13), the system control processor 64 in connection with the effector control processor 200 control the robotic effector 202 based on the reference view information being considered (S15). If no sufficient correlation exists, then the system control processor may either increment the reference view information, or alternatively change the angle the object is being viewed from by controlling the signals received from the incoherent optical to electrical converter 62 by the multiplexing interface 54 (S14). Depending upon the embodiment for which the system control processor is programmed, one of these parameters will be incremented in order to iteratively cross-correlate new combinations of reference view information and information indicative of objects being viewed. Thus, the correlation program is again initiated.

Each time the robotic effector is controlled based upon reference view information and program information stored within the effector of the control processor, the effector control processor monitors the information stored therein to determine whether the task assigned to the robotic effector is completed (S16). If so, then the operation of the vision system of the present invention is completed (S17). However, if additional steps are necessary to perform the task, the entire program utilized by the system control processor 64 is repeated in order to continue the operation of the vision system of the present invention. The vision system of the present invention thus substantially simulates human vision through the use of near real-time correlation implemented through the use of optical parallel processing.

BRIEF DESCRIPTION OF OPERATION

In operation, the programmable optical processor based machine vision system of the present invention functions to view an object and provide information necessary to control a robotic effector or manipulator 202. The object being viewed is illuminated by a coherent optical to incoherent illuminator 68 which diffuses coherent light produced by the electrical to coherent optical converter 66. The object is then viewed by at least one video camera within the incoherent optical to electrical converters 52 to produce a video signal which is gain controlled by the sensor control processor 62 and used to produce an incoherent optical image by object electrical to incoherent optical converter 56 which may be a television monitor or display.

The incoherent optical signal produced by the object electrical to incoherent optical converter 56 is converted into a coherent optical signal $o(x,y)$ corresponding thereto by the object spatial light modulator 20 and its associated object read light beam splitter 26 which received coherent light from the coherent light source 24.

Simultaneous to the monitoring of the object to be viewed by the object electrical to incoherent converter, the system control processor recalls information from its memory indicative of a reference object or desired object to be identified and converts this information into a reference video signal which is supplied to the reference electrical to incoherent optical converter 58 to produce an incoherent light image of a reference object in a particular spatial orientation and position. This reference incoherent optical image is converted into a reference coherent optical image by the reference spatial light modulator 22 and the reference read light beam splitter 28. This produces a reference signal $r(x,y)$ as shown in FIG. 1.

The Fourier transforms of the object signal $o(x,y)$ and reference signal $r(x,y)$ are taken by their respective object and reference Fourier transform lenses 30, 32. The Fourier transforms of the respective signals are then combined through the use of the beam splitter to produce a sum signal. This sum is squared by the absolute spatial light modulator 52 to produce a combined signal, a portion of which corresponds to the Fourier transform of the correlation of the two signals. This combined signal is then inversely transformed by the inverse Fourier transform lens 36 to produce a coherent optical signal having a portion representative of the cross-correlation of the object signal and reference signals. This coherent cross-correlation signal is monitored by a video camera 40 within the correlated optical to electrical converter 60 in order to convert the cross-correlated optical signal into a cross-correlation video signal. Due to the use of optical parallel processing in the system of the present invention, the cross-correlation of the respective signals may be done substantially instantaneously. All points in the object signal and reference signal are correlated simultaneously. The cross-correlated signal is then evaluated by any known correlation evaluation procedure in order to determine the degree of correlation between the object signal and the reference signal. If a high degree of correlation exists, the system control processor 64 provides the effector control processor 200 with information related to the identification, spatial orientation, and position of the object being viewed, this information being derived from the information related to the desired object to be identified or reference information produced within the system control processor.

If a high degree of correlation is not obtained from the correlation of the object signal and reference signal, the system control processor either compares the same object signal with a new reference signal or compares the same reference signal with a new object signal in order to iteratively correlate information related to a desired object to be identified stored within the system control processor 64 with information related to the scene being viewed or reference object positioned on the viewing table 50.

For example, the viewing perspective of the video cameras within the incoherent optical to electrical converters 52 may be varied in order to change the perspective at which the object is being viewed. The new object signal produced by this change in perspective is then correlated with the reference signal information produced by the system control processor. Alternatively, the system control processor 64 may recall new information from its memory indicative of a new object to be identified or a new spatial orientation of the previous object to be identified. The reference optical signal indicative of this information is then correlated with the object optical signal produced by the multiplexing interface 54 and object electrical to incoherent optical converter 56.

This comparison process is successively iterated in order to discover the desired object to be identified or reference information within the system control processor 64 which corresponds to one perspective of view of the scene being viewed or object to be identified resting on the viewing table 50. When a high degree of correlation occurs the system control processor is then aware of the identity of a particular object being viewed and its spatial orientation on the viewing table 50. This information is then provided to the effector control processor 200 to control the robotic effector 202 to manipulate the object in a desired manner.

The information related to the object being viewed after manipulation is then again correlated with the information present in the memory within the sysem control processor 64 in order to provide information to the effector control processor 200 indicative of the new scene being viewed by the programmable optical processor based machine vision system of the present invention.

The system for programmable optical processor based machine vision thus being described, it should be understood that modification to the system may be made as would occur to one of ordinary skill in the art without departing from the spirit in scope of the present invention.

What is claimed is:

1. A vision system for an industrial robot, said vision system identifying and determining the location and spatial orientation of an object being viewed and comprising:

input means for producing an object signal indicative of said object being viewed;

reference generator means for producing a reference signal indicative of a spatial orientation of a desired object to be identified;

correlation means for cross-correlating said object signal and said reference signal to produce a correlated signal; and discrimination means for determining the degree of correlation between said object signal and said reference signal, a high degree of correlation indicating that said object being viewed is said desired object to be identified arranged in the spatial orientation of said reference signal;

said reference generator means iteratively producing new reference signals indicative of a new spatial orientation of said desired object to be identified for cross-correlation and determination by said correlation means and said discrimination means.

2. The system of claim 1 wherein said input means includes a plurality of video monitors and means for multiplexing the outputs produced by said plurality of video monitors.

3. The system of claim 1 wherein said reference generator means includes;

memory means for storing information representative of said reference signal;

processing means for recalling said information from said memory means and for producing a video signal representative thereof; and display means for converting said video signal into an optical reference signal.

4. The system of claim 3 wherein said input means produces an optical object signal.

5. The system of claim 4 wherein said input means includes;

at least one video monitor means for converting an optical impression of said object being viewed into at least one video signal; and means for converting said at least one video signal into said optical object signal.

6. The system of claim 4 wherein said correlation means includes;

object transform means for optically taking the Fourier transform of said optical object signal;

reference transform means for optically taking the Fourier transform of said optical reference signal;

combination means for optically adding the Fourier transform of said optical object signal and said optical reference signal to produce an optical sum signal;

squaring means receiving and optically squaring said sum signal to produce a product signal;

inverse transform means for optically taking the inverse Fourier transform of said optical product signal to produce a correlated signal.

7. The system of claim 6 wherein said discrimination means is implemented with a digital processing computer.

8. The system of claim 7 further comprising: 'robotic effector means for manipulating the object being viewed; and effector control processor means for controlling said robotic effector means to perform a desired task;

said discrimination means, upon detection of a high degree of correlation, providing said effector control processor means with information about said object being viewed necessary to perform said desired task.

9. The system of claim 8 further comprising:

optical to electrical conversion means for converting said optical correlated signal into its electrical counterpart;

said discrimination means detecting the degree of correlation present in the electrical correlated signal.

10. The system of claim 9 further comprising sensor control means for controlling the gain and synchronization of said optical to electrical conversion means.

11. The system of claim 2 further comprising sensor control means for controlling the gain and synchronization of said means for multiplexing.

12. The system of claim 4 further comprising means for generating coherent light;

said display means and input means modulating said coherent light to produce said optical reference signal and optical object signal, respectively.

13. The system of claim 12 wherein said coherent light is modulated in said display means and input means by spacial light modulators.

14. The system of claim 1 wherein said correlation means cross-correlates said object signal and reference signal with parallel optical processing.

15. The system of claim 14 wherein coherent light is used for said parallel optical processing.

16. The system of claim 6 wherein said object transform means, reference transform means, combination means and inverse transform means utilize coherent light.

17. The system of claim 15 or 16 further comprising a laser producing said coherent light.

18. The system of claim 17 further comprising illumination means for lighting said object being viewed, said illumination means including;

means for receiving said coherent light from said laser; and diffusion means for diffusing said coherent light.

19. A vision system for a industrial robot, said vision system identifying and determining the location and orientation of an object being viewed and comprising:

input means for viewing said object from a plurality of directions and sequentially generating object signals, each indicative of a particular viewed spatial orientation of said object being viewed;

reference generator means for producing a reference signal indicative of a desired object to be identified;

correlation means for cross-correlating each of said object signals with said reference signal to produce a correlation signal; and discrimination means for evaluating the degree of correlation between each of said object signals and said reference signal, a high degree of correlation indicating that said object being viewed is said desired object arranged in the spatial orientation indicated by said object signal under determination.

20. The system of claim 19 wherein said reference generator sequentially generates a plurality of reference signals indicative of a plurality of desired object to be identified;

said correlation means and discrimination means iteratively correlating and evaluating successive combinations of reference and object signals.

21. The system of claim 19 wherein said input means includes a plurality of video monitors and means for multiplexing the outputs produced by said plurality of video monitors.

22. The system of claim 21 wherein said sequentially generated object signals are produced by said video monitors.

23. The system of claim 19 wherein said reference generation means includes;

memory means for storing information representative of said reference signals;

processing means for recalling said information from said memory means and for sequentially producing video signals representative thereof;

display means for converting said video signals into optical reference signals.

24. The system of claim 23 wherein said input means produces optical object signals.

25. The system of claim 24 wherein said input means includes;

a plurality of video monitor means for converting optical impressions of different spatial orientations of said object being viewed into video signals; and means for converting said at least one video signal into said optical object signals.

26. The system of claim 24 wherein said correlation means includes;

object transform means for optically taking the Fourier transform of each said optical object signal;

reference transform means for optically taking the Fourier transform of said optical reference signal;

combination means for optically adding the Fourier transform of said optical object signal and said optical reference signal to produce an optical sum signal;

squaring means for receiving and optically squaring said sum signal to produce a product signal;

inverse transform means for optically taking the inverse Fourier transform of said optical product signal to produce said correlated signal.

27. The system of claim 26 wherein said discrimination means is implemented with a digital processing computer.

28. The system of claim 27 further comprising:

robotic effector means for manipulating the object being viewed; and effector control processor means for controlling said robotic effector means to perform a desired task;

said discrimination means, upon detection of a high degree of correlation, providing said effector control processor means with information about said object being viewed necessary to perform said desired task.

29. The system of claim 28 further comprising:

optical to electrical conversion means for converting said optical correlated signal into its electrical counterpart;

said discrimination means detecting the degree of correlation present in the electrical correlated signal.

30. The system of claim 29 further comprising sensor control means for controlling the gain and synchronization of said optical to electrical conversion means.

31. The system of claim 21 further comprising sensor control means for controlling the gain and synchronization of said means for multiplexing.

32. The system of claim 24 further comprising means for generating coherent light;

said display means and input means modulating said coherent light to produce said optical reference signals and optical object signals, respectively.

33. The system of claim 32 wherein said coherent light is modulated in said display means and input means by spatial light modulators.

34. The system of claim 19 wherein said correlation means cross-correlates said object signal and reference signal with parallel optical processing.

35. The system of claim 34 wherein coherent light is used for said parallel optical processing.

36. The system of claim 26 wherein said object transform means, reference transform means, combination means and inverse transform means utilize coherent light.

37. The system of claim 35 or 36 further comprising a laser producing said coherent light.

38. The system of claim 37 further comprising illumination means for lighting said object being viewed, said illumination means including;

means for receiving said coherent light from said laser; and diffusion means for diffusing said coherent light.

39. A vision system for an industrial robot, said vision system identifying and determining the location and spatial orientation of an object being viewed and comprising:

illumination means for incoherently lighting said object;

input means for viewing said object and producing an object signal indicative of said object as viewed;

coherent modulator means for converting said object signal into a corresponding coherent light object signal;

object optical processing means for taking the Fourier transform of said coherent light object signal;

display means for producing a coherent light reference signal representative of a desired object to be identified;

reference optical processing means for taking the Fourier transform of said coherent light reference signal;

combination means for summing the Fourier transform of said coherent light object signal and that of said coherent light reference signal to produce a sum therebetween;

squaring means for receiving said sum produced by said combination means and squaring said sum to produce a product signal;

inverse transform means for taking the universe Fourier transform of said product signal to produce a cross-correlation signal indicative of the correlation between said object signal and reference signal;

determination means for evaluating the degree of correlation between said object signal and said reference signal, a high degree of correlation indicating that said object being viewed visually corresponds to the desired object to be identified.

40. The system of claims 1, 19 or 39 wherein said system identifies and determines the location being viewed in a substantially real-time fashion.

41. A method of identifying and determining the location and spatial orientation of an object, said method including the steps of;

viewing said object;

producing an object signal indicative of said object being viewed;

sequentially producing a plurality of reference signals, each indicative of a desired object to be identified and its possible spatial orientation;

cross-correlating said object signal with each sequentially produced reference signal to produce a correlation signal;

determining the degree of correlation between said object signal and each of said reference signals, a high degree of correlation indicating that said object being viewed is said desired object arranged in the spatial orientation of said reference signal.

42. The method of claim 41 wherein the step of sequentially producing a plurality of reference signals includes;

recalling information from a memory indicative of a desired object to be identified and its possible spatial orientation;

producing a video signal from said information;

converting said video signal into an optical reference signal; and repeating said steps of recalling, sequentially producing and converting to produce a plurality of optical reference signals indicative of different combinations of objects to be identified and then possible spatial orientations.

43. The method of claim 42 wherein said object signal produced is an optical object signal.

44. The method of claim 43 wherein said step of cross-correlating includes the steps of;

optically taking the Fourier transform of said optical object signal;

optically taking the Fourier transform of said optical reference signal;

optically combining said Fourier transforms of said optical object signal and said optical reference signal to produce a combined signal;

optically squaring said combined signal to produce a square signal;

optically taking the inverse Fourier transform of said square signal to produce said correlation signal.

45. The method of claim 44 further comprising the steps of:

manipulating said object being viewed to perform a desired task while utilizing said reference signal.

46. The method of claim 45 further comprising the steps of:

converting said optically correlated signal into its electrical counterpart;

detecting the degree of correlation present in said electrical correlation signal.

47. The method of claim 46 wherein said step of cross-correlating is performed with coherent light.

48. The method of claim 46 wherein said step of cross-correlating utilizes parallel optical processing.

49. A method of identifying and determining the location and spatial orientation of an object, said method including the steps of:

viewing said object from a plurality of directions and sequentially generating object signals, each indicative of a particular viewed spatial orientation of said object being viewed;

producing a reference signal indicative of a desired object to be identified;

cross-correlating each of said object signals with said reference signal to produce a correlation signal;

determining the degree of correlation between each of said object signals and said reference signal, a high degree of correlation indicating that said object being viewed is said desired object arranged in the spatial orientation indicated by said object signal.

50. The method of claim 49 wherein the step of sequentially producing a plurality of reference signals includes sequentially generating a plurality of reference signals indicative of a plurality of desired objects to be identified.

51. The method of claim 50 wherein said steps of cross-correlating and determining iteratively correlate and evaluate successive combinations of reference and object signals.

52. The method of claim 51 wherein said reference signals and object signals are optical signals.

53. The method of claim 52 wherein said step of cross-correlating includes the steps of:

optically taking the Fourier transform of said optical object signal;

optically taking the Fourier transform of said optical reference signal;

optically combining said Fourier transforms of said optical object signal and said optical reference signal to produce a combined signal;

optically squaring said combined signal to produce a square signal;

optically taking the inverse Fourier transform of said square signal to produce said correlation signal.

54. The method of claim 52 further comprising the steps of:

manipulating said object being viewed to perform a desired task while utilizing said reference signal.

55. The method of claim 54 further comprising the steps of:

converting said optically correlated signal into its electrical counterpart;

detecting the degree of correlation present in said electrical correlation signal.

56. The method of claim 46 wherein said step of cross-correlating is performed with coherent light.

57. The method of claim 46 wherein said step of cross-correlating utilizes parallel optical processing.

58. A method of identifying and determining the location and spatial orientation of an object, said method including the steps of:

illuminating said object in incoherent light;

viewing said object and producing an object signal indicative of said object as viewed;

converting said signal into a corresponding coherent light object signal;

taking the Fourier transform of said coherent light object signal;

producing a coherent light reference signal representative of a desired object to be identified;

taking the Fourier transform of said coherent light reference signal;

combining the Fourier transform of said coherent light object signal and that of said coherent light reference signal to produce a sum therebetween;

squaring said sum to produce a product;

taking the inverse Fourier transform of said product to produce a cross-correlation signal indicative of the correlation between said object signal and reference signal;

determining the degree of correlation between said object signal and said reference signal, a high degree of correlation indicating that said object being viewed visually corresponds to the desired object to be identified.

* * * * *